United States Patent
Babula et al.

(10) Patent No.: US 8,516,569 B2
(45) Date of Patent: *Aug. 20, 2013

(54) UNINTERRUPTED VIRTUAL PRIVATE NETWORK (VPN) CONNECTION SERVICE WITH DYNAMIC POLICY ENFORCEMENT

(75) Inventors: Allu Babula, Orissa (IN); Vishnu Govind Attur, Karnataka (IN); Gautham Chambrakana Ananda, Karnataka (IN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,694

(22) Filed: Jun. 25, 2012

(65) Prior Publication Data

US 2012/0260314 A1    Oct. 11, 2012

Related U.S. Application Data

(63) Continuation of application No. 12/211,912, filed on Sep. 17, 2008, now Pat. No. 8,209,749.

(51) Int. Cl.
*H04L 29/06* (2006.01)

(52) U.S. Cl.
USPC .......................... 726/15; 726/5; 726/6; 726/7

(58) Field of Classification Search
None
See application file for complete search history.

(56) References Cited

U.S. PATENT DOCUMENTS

| | | | |
|---|---|---|---|
| 7,213,263 B2 | 5/2007 | Makineni et al. | |
| 7,246,373 B1 | 7/2007 | Leung et al. | |
| 7,333,799 B2 | 2/2008 | Natarajan | |
| 7,366,794 B2 | 4/2008 | Poeluev | |
| 7,516,486 B2 | 4/2009 | Olivereau et al. | |
| 8,104,081 B2 | 1/2012 | Khanna et al. | |
| 8,209,749 B2 | 6/2012 | Babula et al. | |
| 2003/0088698 A1 | 5/2003 | Singh et al. | |
| 2003/0182431 A1 | 9/2003 | Sturniolo et al. | |
| 2003/0219022 A1 | 11/2003 | Dillon et al. | |
| 2004/0034702 A1 | 2/2004 | He | |
| 2005/0198691 A1 | 9/2005 | Xiang et al. | |
| 2006/0070115 A1 | 3/2006 | Yamada et al. | |
| 2006/0236378 A1 | 10/2006 | Burshan | |
| 2007/0097991 A1 | 5/2007 | Tatman | |
| 2010/0071043 A1 | 3/2010 | Babula et al. | |

*Primary Examiner* — Minh Dinh
(74) *Attorney, Agent, or Firm* — Park, Vaughan, Fleming & Dowler, LLP

(57) ABSTRACT

Techniques for uninterrupted virtual private network (VPN) connection service with dynamic policy enforcement are provided. An existing VPN session between a VPN client and a VPN server detects a change in a VPN network being used for the existing VPN session. New credentials and new policies are received by the VPN client. The new credentials are automatically used to re-authenticate the VPN client to the change during the existing VPN session, and the new policies are dynamically used to enforce the new policies during the existing VPN session on the VPN client.

20 Claims, 3 Drawing Sheets

UNINTERRUPTED VIRTUAL PRIVATE NETWORK (VPN) CONNECTION SERVICE WITH DYNAMIC POLICY ENFORCEMENT

RELATED APPLICATION

The present application is a continuation of, claims priority to, and is co-pending with U.S. Ser. No. 12/211,912, entitled "Uninterrupted Virtual Private Network (VPN) Connection service with Dynamic Policy Enforcement," filed on Sep. 17, 2008, which presently stands allowed and is set to issue on Jun. 26, 2012 as U.S. Pat. No. 8,209,749; the disclosure of which is incorporated by reference herein in its entirety.

BACKGROUND

Increasing the affairs of individuals and enterprises are being conducted in an automated manner over the Internet. Enterprises now engage in selling their products and services over the Internet; individuals also engage in communicating with one another over the Internet; employees may also engage in accessing secure resources of their employers over the Internet, etc.

When employees access secure assets of an enterprise over the Internet, the enterprise has to ensure that the access is secure. One mechanism to achieve this is via a Virtual Private Network (VPN) connection.

VPN transactions use authentication and encryption techniques for purposes of ensuring that communications are secure. Essentially, a VPN permits insecure communications lines to be used in a secure manner.

However, management of VPN sessions can be a challenging task. This can occur for a variety of reasons.

For example, consider Secure Socket Layer (SSL) VPN users that switch from one network to another network during an already existing SSL VPN session. The users get disconnected during the network switch and the users have to reconnect to the SSL VPN server to access the new network and its protected assets.

Nowadays, it is a very common situation for a VPN user to frequently switch between different networks, such as when the VPN user switches from a Local Area Network (LAN) via a hardwired connection to a wireless connection or vice versa. Here, the user may be physically moving his/her laptop around that necessitates the change in network connection. Also, network resets frequently occur for a variety of reasons, such as a weak or interrupted wireless signal, etc. Still further, network administrators may want to enforce new policies on a network, which requires resetting the network connections. In each of these situations, a user's VPN session is terminated and the user is forced to manually re-authenticate to the different network or to the reset network.

The challenge is to detect the dynamic network change during an existing VPN session or connection and yet still maintain that VPN session as a seamless and uninterrupted connection during the change. With existing technology this cannot be achieved.

Consequently, there is a need for improved techniques for VPN connection management and service.

SUMMARY

In various embodiments, techniques for uninterrupted virtual private network (VPN) connection service with dynamic policy enforcement are provided. In an embodiment, a method for uninterrupted VPN connection service with dynamic policy enforcement is provided. More specifically a request is received for to change an Internet Protocol (IP) address for an existing VPN session between a VPN client and a VPN server. The new IP address is to replace an existing IP address being used in the existing VPN session. Next, a VPN connection table entry is updated for the VPN session with the new IP address. Finally, a new credential is supplied to the VPN client for automatically re-authenticating during the existing VPN session to the new IP address without the VPN client losing service to the existing VPN session. The new credential is to be used to replace an existing credential being used for authentication to the existing VPN session and the existing IP address. Also, the new credential authenticates to the new IP address and the existing VPN session.

DETAILED DESCRIPTION

Figure 1:
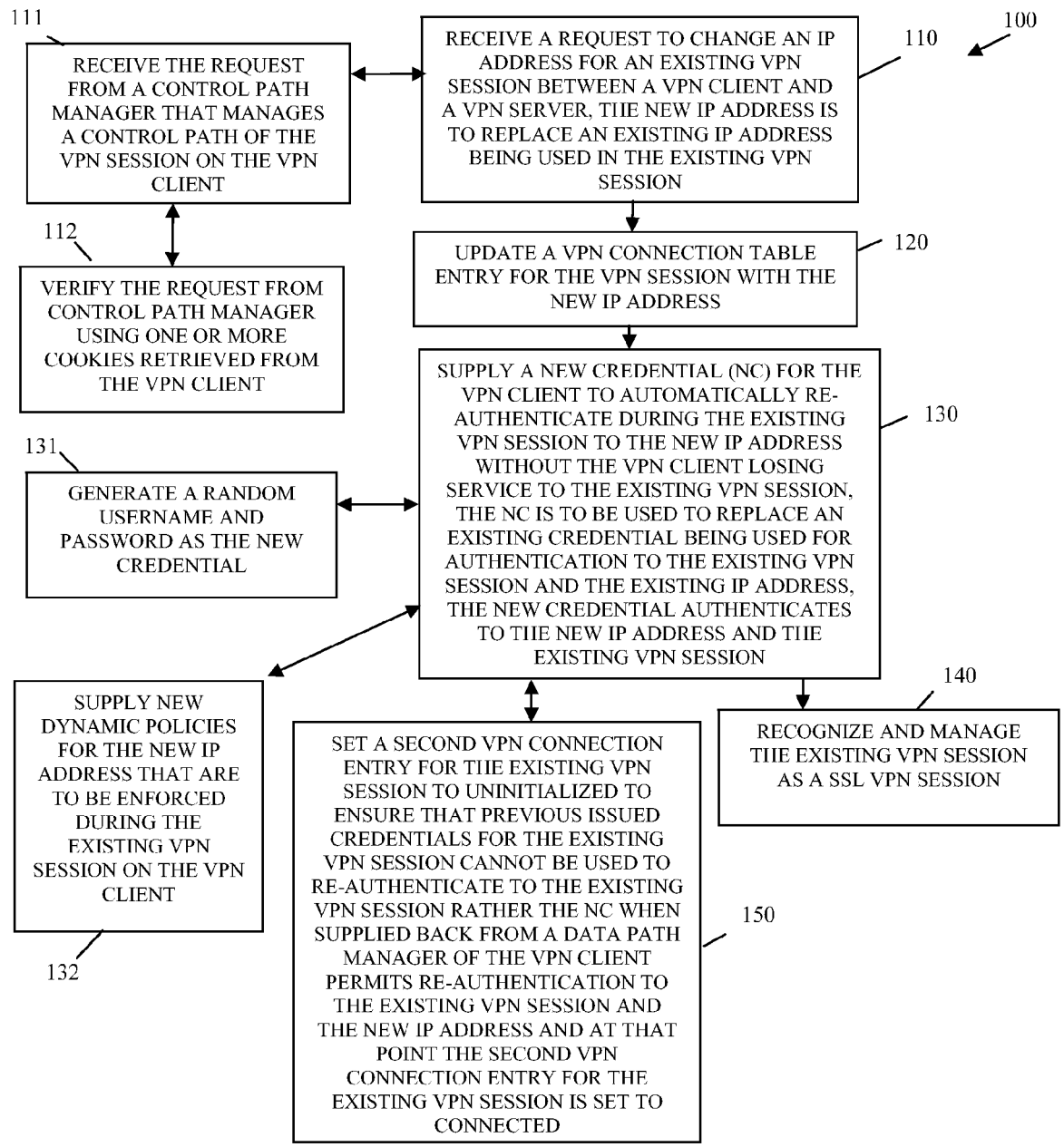
FIG. 1 is a diagram of a method for uninterrupted VPN connection service with dynamic policy enforcement, according to an example embodiment.

A "resource" includes a user, content, a processing device, a node, a service, an application, a system, a gateway, a directory, a data store, a World-Wide Web (WWW) site, an end-user, groups of users, combinations of these things, etc. The terms "service," "module," "software," and "application" may be used interchangeably herein and refer to a type of software resource that includes instructions, which when executed by a machine performs operations that change the state of the machine and that may produce output.

A "client" or "client workstation" is machine (computer, processing device, etc.) that a user uses to access a secure network. The client includes a processing environment, and the processing environment has a configuration that includes information and setting related to: a type and version of an operating system (OS) installed on the client, a type and version of antivirus software available on the client (if at all), and specific types and versions of software installed and available on the client (if at all). As used herein the terms "client," "desktop," "client machine," "client workstation," and "workstation" may be used interchangeably and synonymously.

A "server" is a machine that the client interacts with over a network, such as the Internet. The user, via its client, attempts to establish a secure connection with the server, via a Virtual Private Network (VPN) session for purposes of accessing secure resources of the server.

A "virtual private network (VPN)" is a special type of network that is carved out of or tunneled through another network, such as an insecure network like the Internet. There can be different types of VPN's. In various embodiments presented herein, a Secure Socket Layer (SSL) VPN is used.

A "VPN session" refers to a successful VPN connection made by a user via the user's client to a server after the user has authenticated. All communication that occurs between the client and the server where the user is not forced to manually re-authenticate with the server is considered herein to be part of the same VPN session.

Various embodiments of this invention can be implemented in existing network architectures, storage systems, security systems, data centers, and/or communication devices. For example, in some embodiments, the techniques presented herein are implemented in whole or in part in the Novell® network, proxy server products, email products, Access Manager® products, operating system (OS) products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

FIG. 1 is a diagram of a method 100 for uninterrupted VPN connection service with dynamic policy enforcement, according to an example embodiment. The method 100 (herein after referred to as "VPN connection manager") is implemented in a machine-accessible and computer-readable medium and instructions. The instructions when processed by one or more machines (computer, processing device, etc.) perform the processing depicted in the FIG. 1. The VPN connection manager is operational over a network and the network is wired, wireless, or a combination of wired and wireless. In an embodiment, the network is a wide-area network (WAN), such as the Internet. In other cases, the network is a local-area network (LAN). It is noted that the network can be a combination of both a LAN and a WAN.

Initially, the processing context that exists is one in which a VPN client is connected to a VPN server via a VPN session. In other words, the VPN client has properly authenticated and stabled the existing VPN session with the VPN server. The initial connection and the processing that ensues are managed by the VPN connection manager; however, the initial connection is assumed to have occurred via previous conventional VPN connection techniques known to one of ordinary skill in the art.

The VPN client includes two managers that assist with the VPN session and the VPN connection: a control path manager (also referred to as a control channel manager herein and below) and a data path manager (also referred to as a data channel manager herein and below). The control path manager remains connected to the VPN connection manager even when events are detected that temporarily render the VPN session unusable by the data path manager. The control path manager assists in authentication the VPN client and initially establishing the VPN session between the VPN client and the VPN server. The data path manager is what a user or automated service uses to communicate and transact business over the VPN session from and between the VPN client and the VPN session.

It is now within this context that additional novel aspects of the processing associated with the VPN connection manager are now discussed with reference to the FIG. 1.

At 110, the VPN connection manager receives a request to change an Internet Protocol (IP) address for a resource associated with the existing VPN session between the VPN client and the VPN server. The new IP address is to replace an existing IP address that was changed for the resource or that may even represent a new resource that replaces the resource within the VPN session.

According to an embodiment, at 111, the request is received from a control path manager that processes on the VPN client and that manages control channel or path communications on the VPN client for the VPN session.

Continuing with the embodiment at 111 and at 112, the VPN connection manager verifies the request and perhaps the identity of the control path manager using one or more cookies that were set on the VPN client for the existing VPN session. The VPN connection manager retrieves these cookies when the request is received. Verification can occur before the request is recognized or after the request is recognized by the VPN connection manager.

At 120, the VPN connection manager updates an entry in a VPN connection table that the VPN connection manager manages for the VPN session and for other VPN sessions that the VPN connection manager is responsible for. The update changes the previous or existing IP address for the VPN session to the new IP address that is to be used and that was communicated via the request. Other information may be housed in the VPN connection table with the entry as well, such as a state indicating either uninitialized or connected for the VPN session. The VPN connection manager does not permit any attempt at authentication to the existing VPN session when the state is set to connected. In other words, the state has to be uninitialized before the VPN connection manager permits authentication attempts to the VPN session.

In a conventional scenario, the state is set to uninitialized when an IP address change for a resource is detected and the user has to manually re-establish a new VPN session via initial manual re-authentication. Essentially, there is interrupted service and the existing VPN session is terminated and a new one via the conventional mechanisms has to be established. This is burdensome and in many cases not necessary but such is the state of convention approaches. The processing of the VPN connection manager solves this problem as detailed herein.

Once the VPN connection table is updated with the new IP address, at 130, the VPN connection manager supplies a new credential for the VPN client to automatically and seamlessly re-authenticate during the existing VPN session, such that the existing VPN session is not terminated and remains active. The automatic re-authentication occurs to the existing VPN session and to the new IP address.

The new credential replaces an existing credential that the VPN client was using to authenticate to the existing VPN session and the existing IP address, which is now being changed to the new IP address. So, the new credential permits the VPN client to automatically re-authenticate to the existing VPN session and the new IP address without losing service associated with the existing VPN session. The existing VPN session does not terminate during this process.

According to an embodiment, at 131, the VPN connection manager generates a random username and random password pair as the new credential.

In another situation, at 132, the VPN connection manager also supplies new dynamic policies (such as security access restrictions) for the new IP address and/or the existing VPN session. These new policies are to be dynamically enforced during the existing VPN session. So, policies are changeable as well. In this manner, VPN or network administrators can dynamically push and implemented VPN policy changes without terminating existing VPN sessions. Termination of sessions frustrates end users and reflects poorly on an enterprises VPN services or access to an enterprise's secure resources.

In an embodiment, at 140, the VPN connection manager recognizes and manages the existing VPN session as a Secure Socket Layer (SSL) VPN session.

In a particular situation, at 150, the VPN connection manager sets a second VPN entry in the VPN connection table for the existing VPN session to a status of uninitialized. This is done as soon as the new credential and/or new policies are sent to the VPN client for the existing VPN session. This ensures no security breach, since only a VPN client supplying the new credential can authenticate to the existing VPN session and as soon as the VPN client supplies back the new credential and is authenticated properly, which it will be, the status is changed to connected in the second VPN connection entry within the VPN connection table. Credentials submitted for a VPN session with a status set to connected are ignored. So, security is maintained during this process of uninterrupted VPN session continuity.

A particular example scenario is now presented to illustrate the functionality of the VPN connection manager, as described above, and as is further described with the method 200 below with reference to the FIG. 2. It is noted that this is but one scenario and others can exist within the confines of the processing discussed herein above and below.

Firstly, a VPN client has already authenticated and established a VPN session with a VPN server. Next, whenever there is a change in the VPN network, a network change detection module on the VPN client informs an Applet/ActiveX module regarding the network change on the VPN client.

The Applet/ActiveX module informs the VPN connection manager using the control path manager on the VPN client regarding an IP address change, since the upper channel or control path manager is connected to the VPN connection manager via Hypertext Transfer Protocol (HTTP) or HTTP over SSL (HTTPS), the control path manager remains connected even on the network change that is detected and being reported to the VPN connection manager.

At this point the VPN connection manager has the IP address change and updates the session table (VPN connection table) for the existing VPN session with the new IP address.

The VPN connection manager then generates a random user id and password (new credential) for the same and existing VPN session. The VPN connection manager does not authenticate any more for the old credentials that were being used with the existing VPN session. This is a security feature so that if someone else gets the old credential, he/she cannot authenticate to the existing VPN session.

The Applet/ActiveX module than requests that the VPN connection manager supply the new credential and any new policies needed with the changed IP address, since the control path manager is still valid, the VPN connection manager verifies the request using cookies and perhaps other information.

Assuming the control channel (control path manager) is valid; the VPN connection manager provides the new id and password (new credential) for data path or data channel authentication on the VPN client to the existing VPN session and the new IP address. Any new policies are also provided.

The data channel (also referred to herein as data path manager) that processes on the VPN client, automatically and seamlessly re-authenticates back to the VPN connection manager using the random id and password (new credential). The user of the VPN session is unaware of this activity and thus experiences no interruption in service with the existing VPN session during this process. The data channel is then reconfigured and brought up for the same VPN session on the VPN client of the user.

Once the data channel is up all protected resources of the VPN session with the new policies can be accessed without any issues.

So, it is now apparent how seamless (from the perspective of the end user), secure, and dynamic imposed policy can be achieved via reconnection to the existing VPN session without any user knowledge or interaction being required.

Figure 2:
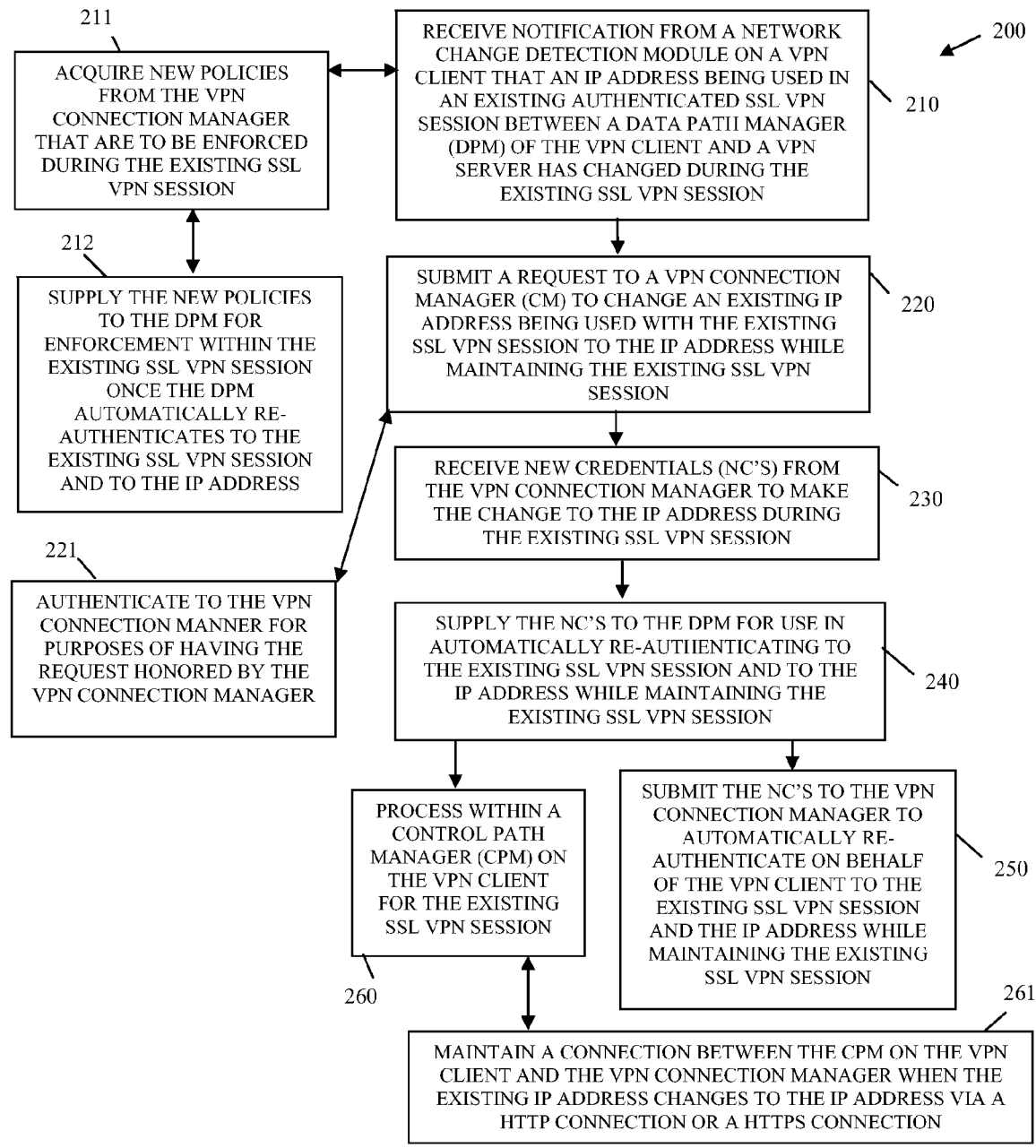
FIG. 2 is a diagram of another method for uninterrupted VPN connection service with dynamic policy enforcement, according to an example embodiment.

FIG. 2 is a diagram of another method 200 for uninterrupted VPN connection service with dynamic policy enforcement, according to an example embodiment. The method 200 (herein after referred to as "SSL VPN connection and policy service") is implemented in a machine-accessible and computer-readable medium and instructions. The instructions when processed by one or more machines (computer, processing device, etc.) perform the processing depicted in the FIG. 2. The SSL VPN connection and policy service is operational over a network and the network is wired, wireless, or a combination of wired and wireless.

The SSL VPN connection and policy service presents a different perspective and in some cases enhanced perspective of the VPN connection manager represented by the method 100 of the FIG. 1. The VPN connection manager was presented from the perspective of a VPN server service or process whereas the SSL VPN connection and policy service is presented from the perspective of the VPN client; specifically, the SSL VPN connection and policy service is presented from the perspective of a control channel or control path manager of the VPN client.

At 210, the SSL VPN connection and policy service receives notification from a network change detection module on a VPN client that an IP address being used in an existing authenticated SSL VPN session between a data path manager or the VPN client and a VPN service has changed during an existing VPN session.

According to an embodiment, at 211, the SSL VPN connection and policy service acquires new policies from the VPN connection manager that are to be enforced dynamically during the existing SSL VPN session. So, policies for the existing VPN session can change with the changed IP address. In fact, this situation may be most likely in VPN session distributions that occur in the industry.

Continuing with the embodiment of 211 and at 212, the SSL VPN connection and policy service supplies the new policies to the data path manager for enforcement within the existing SSL VPN session. This is done once the data path manager successfully and automatically re-authenticates to the existing SSL VPN session and to the IP address (discussed below).

At 220, the SSL VPN connection and policy service submits a request to the VPN connection manager to change an existing IP address being used with the existing SSL VPN session to the IP address detected in the changed network conditions by the network detection module. This is being requested while the existing SSL VPN session is still active on the VPN client.

In an embodiment, at 221, the SSL VPN connection and policy service authenticates to the VPN connection manager for purposes of having the request honored by the VPN connection manager. This also ensures added security and that the request is not coming from a bogus client and not the legitimate VPN client.

At 230, the SSL VPN connection and policy service receives new credentials from the VPN connection manager (generated and produced in the manner discussed above with reference to the VPN connection manager depicted within the context of the method 100 and the FIG. 1.). The new credentials permit the SSL VPN connection and policy service to make the change to the IP address during the existing VPN session with uninterrupted service from the perspective of the user of the existing VPN session.

At 240, the SSL VPN connection and policy service supplies the new credentials to the data path manager or data channel manager of the VPN client. This is used for automatically re-authenticating and dynamically and in real time authenticating to the existing SSL VPN session and to the IP address while the existing SSL VPN session is maintained.

According to an embodiment, at 250, the SSL VPN connection and policy service submits the new credentials to the VPN connection manager to automatically/dynamically/real time authenticate on behalf of the VPN client to the existing VPN session and the IP address. This is done again while maintaining the existing VPN session.

In another case, at 260, the SSL VPN connection and policy service processes within a control channel manager or control path manager on the VPN client for the existing SSL VPN session, as mentioned above at the beginning of the discussion of the SSL VPN connection and policy service.

Continuing with the embodiment at 260 and at 261, the SSL VPN connection and policy service maintains a connection between the control path manager on the VPN client and the VPN connection manager when the existing IP address changes to the IP address. This is done via an HTTP or HTTPS connection as was mentioned above with reference to the VPN connection manager discussed within the context of the method 100 and the FIG. 1.

Figure 3:
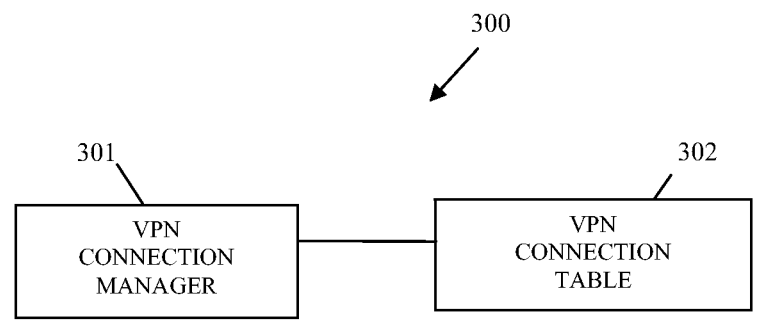
FIG. 3 is a diagram of a VPN connection and dynamic policy enforcement system, according to an example embodiment.

FIG. 3 is a diagram of a VPN connection and dynamic policy enforcement system 300, according to an example embodiment. The VPN connection and dynamic policy enforcement system 300 is implemented as instructions on or within a machine-accessible and computer-readable medium. The instructions when executed by machines of a network perform, among other things, processing depicted with respect to the methods 100 and 200 of the FIGS. 1 and 2, respective. The VPN connection and dynamic policy enforcement system 300 is also operational over a network, and the network is wired, wireless, or a combination of wired and wireless.

The VPN connection and dynamic policy enforcement system 300 includes a VPN connection manager 301 and a VPN connection table 302. Each of these and their interactions with one another will now be discussed in turn.

The VPN connection manager 301 is implemented in a computer-readable storage medium as instructions that process over a network on a server machine (computer, processor-enabled device, or etc.). Example aspects of the VPN connection manager 301 were presented above with respect to the methods 100 and 200 of the FIGS. 1 and 2, respectively.

The VPN connection manager 301 authenticates a request from a VPN client to change VPN information (IP addresses, policies, encryption being used, etc.) for an existing VPN session. This is done while allowing the VPN client to maintain the existing VPN session.

Additionally, the VPN connection manager 301 updates an entry for the existing VPN session within the VPN connection table 302 to include new credentials that permit the VPN client to automatically and dynamically (in real time) re-authenticate to the existing VPN session with changed VPN information.

The new credentials replace existing credentials being used with existing network information for the existing VPN session. The new credentials and new policies for the changed VPN information and the existing VPN session are provided to the VPN client for dynamic re-authentication to the existing VPN session.

In an embodiment, the request is received from a control channel manager that processes on the VPN client. Moreover, the request is generated by the control channel manager in response to a notification raised by a network detection module on the VPN client. This indicates the presence of the changed VPN information that occurs during the existing VPN session.

In one case, the request is received with the existing VPN session is reset to have the new policies dynamically enforced on the VPN client during the existing VPN session.

In another case, the request is received when the changed VPN information indicates an IP address associated with a VPN server or a resource of the VPN server that the VPN client users with the existing VPN session has changed to a new IP address.

In an embodiment, the VPN connection manager 301 sets an attribute in the entry in the VPN connection table 302 to indicate that the existing VPN session is uninitialized when the new credentials are provided to the VPN client. The VPN connection manager 301 then resets the attribute in the entry to connected once the VPN connection manager 301 automatically re-authenticates with the new credentials. This was discussed above with reference to the methods 100 and 200 of the FIGS. 1 and 2, respectively.

The VPN connection table 302 is implemented in a computer-readable storage medium and is accessible to and accessed by the VPN connection manager 301 on the server machine. Some example aspects of the VPN connection table 302 were presented above with reference to the methods 100 and 200 of the FIGS. 1 and 2, respectively.

The VPN connection table 302 contains state and connection information for all VPN clients in the VPN server. State can either be uninitialized or connected. State is set to connected after a VPN client authenticates to the VPN connection manager 301. The VPN server does not authenticate a second time after this authentication to any VPN clients if the same random credentials are provided. So, during a VPN client network change when the VPN client requests for new credentials, the VPN connection manager 301 changes the state to uninitialized after the credential generation. When the VPN client forms a new data channel for the existing VPN session this state is then changed to connected by the VPN connection manager 301.

So, when the user changes the network, his/her authenticity also changes. This is taken care of by providing a new set of policies dynamically via the VPN connection manager 301.

To prevent hackers from trying to hijack to the existing VPN session, the VPN connection manager 301 rejects any authentication verification from the data channel (data path manager) if the connection state in the VPN connection table 302 is already set to connected.

So, anyone trying to use a same username/password to authenticate fails to succeed, because the VPN connection manager 301 does not fine the entry in the VPN connection table 302 with the state set to uninitialized.

Figure 4:
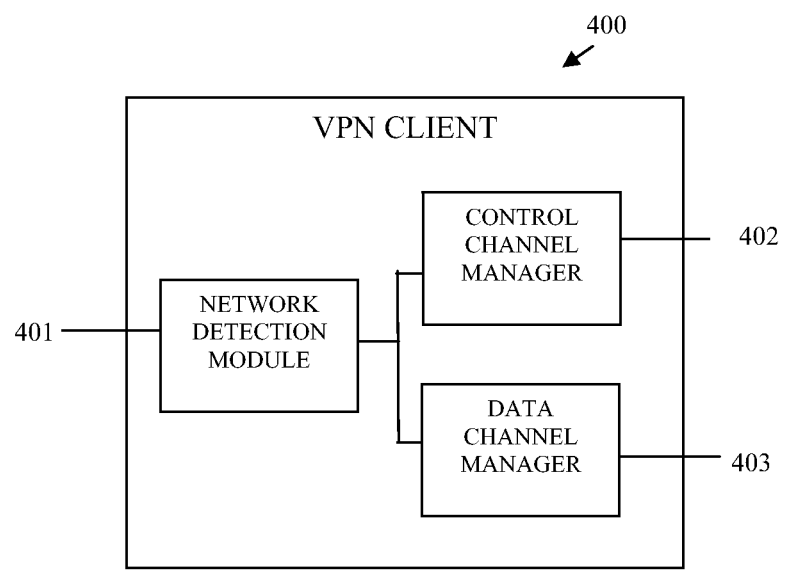
FIG. 4 is a diagram of another VPN connection and dynamic policy enforcement system, according to an example embodiment.

FIG. 4 is a diagram of another VPN connection and dynamic policy enforcement system 400, according to an example embodiment. The VPN connection and dynamic policy enforcement system 400 is implemented as instructions on or within a machine-accessible and computer-readable medium. The instructions when executed by machines of a network perform, among other things, processing depicted with respect to the methods 100 and 200 of the FIGS. 1 and 2, respectively. The VPN connection and dynamic policy enforcement system 400 is also operational over a network, and the network is wired, wireless, or a combination of wired and wireless. The VPN connection and dynamic policy enforcement system 400 presents another and in some cases enhanced perspective of the VPN connection and dynamic policy enforcement system 300 represented by the FIG. 3.

The VPN connection and dynamic policy enforcement system 400 includes a network detection module 401, a control channel manager 402, and a data channel manager 403. Each of these and their interactions with one another will now be discussed in turn.

The network detection module 401 is implemented in a computer-readable storage medium as instructions that process on a VPN client over a network. Some example aspects of the network detection module 401 were presented above with reference to the method 200 of the FIG. 1.

The network detection module 401 detects a change in an existing VPN session between a VPN client and a VPN server and sends a notification of the change to the control channel manager 402.

In an embodiment, the change is recognized as a new IP address that is different from an existing IP address being used by the data channel manager 403 with the existing VPN session.

The control channel manager 402 is implemented in a computer-readable storage medium as instructions that process on a VPN client over the network. Example aspects of the processing associated with the control channel manager 402 were discussed above with reference to the methods 100 and 200 of the FIGS. 1 and 2, respectively.

The control channel manager 402 receives a notification of the change from the network detection module 401. In response, the control channel manager 402 reports the change to a VPN connection manager, such as the VPN connection manager depicted in method 100 of the FIG. 1 and the VPN connection manager 301 of the system 300 of the FIG. 3.

The control channel manager 402 receives new credentials and new policies for the existing VPN session from the VPN connection manager. The new credentials and policies are then supplied to the data channel manager 403.

In an embodiment, the control channel manager 402 remains connected to the VPN connection manager even with the change that the network detection module 401 notified the control channel manager 402 of.

According to an embodiment, the control channel manager 402 authenticates to the VPN connection manager to have the new credentials and new policies delivered back to the control channel manager 402 for subsequent delivery to the data channel manager 403.

The data channel manager 403 is implemented in a computer-readable storage medium as instructions that process on the VPN client over the network. Example aspects of the processing associated with the data channel manager 403 were discussed above with reference to the methods 100 and 200 of the FIGS. 1 and 2, respectively.

The data channel manager 403 uses the new credentials, via the control channel manager 402, to automatically and dynamically re-authenticate the existing VPN session. This is done without losing the VPN session and the data channel manager 403 also enforces dynamically the new policies within the existing VPN session.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented system, comprising:
a server machine having memory and a processor the memory configured with Virtual Private Network (VPN) connection manager that executes on the processor of the server machine within a network; and
a VPN connection table implemented in a non-transitory computer-readable storage medium and processed by the VPN connection manager on the server machine of the network;
wherein the VPN connection manager authenticates a request from a VPN client to change VPN information for an existing VPN session while allowing the VPN client to maintain the existing VPN session, and wherein the VPN connection manager updates an entry for the existing VPN session within the VPN connection table to include new credentials that permit the VPN client to automatically and dynamically re-authenticate to the existing VPN session with changed VPN information, wherein the new credentials replace existing credentials being used with existing network information for the existing VPN session, and wherein the new credentials and new policies for the changed VPN information and the existing VPN session are provided to the VPN client for dynamic re-authentication to the existing VPN session.

2. The system of claim 1, wherein the request is received from a control channel manager that processes on the VPN client.

3. The system of claim 2, wherein the request is generated by the control channel manager in response to notification raised by a network detection module on the VPN client that indicates the presence of the changed VPN information that occurs during the existing VPN session.

4. The system of claim 1, wherein the request is received when the existing VPN session is reset to have the new policies dynamically enforced on the VPN client during the existing VPN session.

5. The system of claim 1, wherein the request is received when the changed VPN information indicates an Internet Protocol (IP) address associated with a VPN sever that the VPN client uses for the existing VPN session has changed to a new IP address.

6. The system of claim 1, wherein the VPN connection manager sets an attribute in the entry in the VPN connection table to indicate that the existing VPN session is uninitialized when the new credentials are provided to the VPN client and resets the attribute in the entry to connected once the VPN connection manager automatically re-authenticates with the new credentials.

7. A machine-implemented system, comprising:
a Virtual Private Network (VPN) client having memory and a processor, the memory configured with a network detection module that processes on the processor of the VPN client over a network;
the memory configured with a control channel manager that processes on the processor of the VPN client over the network; and
the memory also configured with a data channel manager that processes on the processor of the VPN client over the network;
wherein the network detection module is to detect a change in an existing VPN session between the VPN client and a VPN server and sends a notification of the change to the control channel manager, the control channel manager reports the change to a VPN connection manager over the network and receives new credentials and new policies for the existing VPN session that are supplied to the data channel manager, the data channel manager uses the new credentials to automatically re-authenticate the existing VPN session without losing the VPN session and the data channel manager enforces the new policies within the existing VPN session.

8. The system of claim 7, wherein the control channel manager remains connected to the VPN connection manager even with the change that the network detection module notified the control channel manager of.

9. The system of claim 7, wherein the control channel manager authenticates to the VPN connection manager to have the new credentials and new policies delivered back to the control channel manager.

10. The system of claim 7, wherein the change is recognized as a new Internet Protocol (IP) address that is different from an existing IP address being used by the data channel manager with the existing VPN session.

11. A method residing as instructions in a non-transitory computer-readable storage medium that execute on a processor, the processor when accessed performing the method, comprising:

replacing, by the processor, an existing Internet Protocol (IP) address with a new IP address, the new IP address replaces the existing IP address being used in an existing Virtual Private Network (VPN) session; and
supplying, by the processor, a new credential to a VPN client for automatically re-authenticating to the existing VPN session using the new IP address without losing service to the existing VPN session.

12. The method of claim 11 further comprising, managing, by the processor, the existing VPN session as a Secure Socket Layer VPN session.

13. The method of claim 11 further comprising, processing, by the processor, the method within the VPN client.

14. The method of claim 11 further comprising, acquiring, by the processor, different policies for enforcement against the VPN client during the existing VPN session while using the new IP address.

15. The method of claim 11, wherein replacing further includes replacing the existing IP address in response to a request received.

16. The method of claim 15, wherein replacing further includes receiving the request from a control path manager that manages a control path for the existing VPN session on the VPN client.

17. The method of claim 15, wherein replacing further includes verifying the request via a cookie on the VPN client.

18. The method of claim 11, wherein supplying further includes generating the new credential as a randomly generated identifier and password combination for the VPN client.

19. The method of claim 11, wherein supplying further includes supplying new policies that are different from previous policies with the new credential for enforcement on the VPN client with the new IP address during the existing VPN session.

20. The method of claim 11, wherein supplying further includes automatically generating the new credential for the new IP address and maintaining the existing VPN session while the new IP address is being re-authenticated to the existing VPN session on behalf of the VPN client.

* * * * *